United States Patent
Shanmugam et al.

(10) Patent No.: US 10,802,948 B2
(45) Date of Patent: Oct. 13, 2020

(54) INTEGRATED TESTING DATA PROVISIONING AND CONDITIONING SYSTEM FOR APPLICATION DEVELOPMENT

(71) Applicant: Bank of America Corporation, Charlotte, NC (US)

(72) Inventors: Parthiban T. Shanmugam, Charlotte, NC (US); Srinivasa Rao Batchu, Charlotte, NC (US); Sujata Devon Raju, Frisco, TX (US); Bayyareddy Sreenivasulu Reddy, Frisco, TX (US); Durga Prasad Turaga, Murphy, TX (US); Vinod Kumar Alladi, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 231 days.

(21) Appl. No.: 16/035,064

(22) Filed: Jul. 13, 2018

(65) Prior Publication Data
US 2020/0019489 A1 Jan. 16, 2020

(51) Int. Cl.
G06F 11/36 (2006.01)

(52) U.S. Cl.
CPC ...... *G06F 11/3664* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | |
|---|---|---|
| 7,054,866 B2 | 5/2006 | Trivedi |
| 7,330,722 B1 | 2/2008 | Kirtley et al. |
| 7,734,600 B1 | 6/2010 | Wise et al. |
| 7,814,142 B2 | 10/2010 | Mamou et al. |
| 7,814,470 B2 | 10/2010 | Mamou et al. |
| 7,890,951 B2 | 2/2011 | Vinberg et al. |
| 8,041,760 B2 | 10/2011 | Mamou et al. |
| 8,978,011 B2 | 3/2015 | Gao et al. |
| 8,988,998 B2 | 3/2015 | Adam et al. |
| 9,053,580 B2 | 6/2015 | Adam et al. |
| 9,075,883 B2 | 7/2015 | Verkasalo |
| 9,110,496 B1 | 8/2015 | Michelsen |
| 9,128,773 B2 | 9/2015 | Beaty et al. |
| 9,137,656 B2 | 9/2015 | O'Leary |
| 9,723,481 B2 | 8/2017 | Schell et al. |

(Continued)

*Primary Examiner* — Qing Chen
(74) *Attorney, Agent, or Firm* — Michael A. Springs; Moore & Van Allen PLLC; Seongun M. Hong (57) ABSTRACT

Embodiments of the present disclosure provide a system, computer program product, and method for providing a centralized, automated, and integrated platform for management and provisioning of testing data. In particular, the integrated platform may provide users with a comprehensive interface through which the user may procure and/or customize data for the purposes of testing an application within a testing environment before migrating the application to a production environment. In this regard, the integrated platform may comprise various applications that allow users to migrate, mine, verify, condition, sanitize, reserve, synthesize, and/or provision testing data, among other such functions.

18 Claims, 4 Drawing Sheets

(56) References Cited

U.S. PATENT DOCUMENTS

| | | | |
|---|---|---|---|
| 2004/0133848 A1* | 7/2004 | Hunt | G06F 16/9577 |
| | | | 715/273 |
| 2005/0262189 A1 | 11/2005 | Mamou et al. | |
| 2006/0031813 A1 | 2/2006 | Bishop et al. | |
| 2007/0156662 A1* | 7/2007 | Tully | G06F 16/284 |
| 2007/0168370 A1 | 7/2007 | Hardy | |
| 2008/0127093 A1 | 5/2008 | Fernandez-Ivern et al. | |
| 2008/0183830 A1* | 7/2008 | Noller | G06F 16/2457 |
| | | | 709/206 |
| 2009/0119579 A1* | 5/2009 | Fellenstein | H04L 63/20 |
| | | | 715/234 |
| 2010/0291907 A1 | 11/2010 | MacNaughtan et al. | |
| 2011/0066606 A1* | 3/2011 | Fox | G06F 21/84 |
| | | | 707/706 |
| 2011/0244440 A1 | 10/2011 | Saxon et al. | |
| 2014/0229619 A1* | 8/2014 | Han | H04L 67/02 |
| | | | 709/225 |
| 2015/0143064 A1 | 5/2015 | Bhargava et al. | |
| 2016/0092696 A1 | 3/2016 | Guglani et al. | |
| 2017/0220458 A1* | 8/2017 | Finger | G06F 11/368 |
| 2018/0095866 A1* | 4/2018 | Narayanan | G06F 11/3688 |

* cited by examiner

INTEGRATED TESTING DATA PROVISIONING AND CONDITIONING SYSTEM FOR APPLICATION DEVELOPMENT

FIELD OF THE INVENTION

The present disclosure embraces a system, computer program product, and computer-implemented method for an integrated data provisioning system for application development. In particular, the system provides a centralized, automated, and integrated platform for verification, conditioning, and provisioning of testing data for development purposes.

BACKGROUND

In the application testing environment, conventional testing platforms may contain a number of disparate and disjointed applications to manage testing data, which may create challenges in using and maintaining the applications. Thus, there is a need for an efficient, centralized system to manage the conditioning and provisioning of the testing data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system that provides an automated, integrated, and centralized platform for managing and providing testing data. In particular, the platform provides users with a plurality of standardized tools for mining, reserving, and conditioning testing data for use in application development. Some of the conditioning functions of the platform may be automated such that the platform may provide testing data which has been conditioned based on the application being tested. Accordingly, the platform may efficiently and dynamically provide customized testing data for each application in development.

Accordingly, embodiments of the present disclosure provide a system for managing testing data using an integrated platform. The system may comprise a processor; a communication interface; and a memory having executable code stored thereon. The executable code, when executed by the processor, causes the processor to receive, from a user computing system, a request to access a web server for the integrated platform; based on receiving the request to access the web server, present a graphical interface to the user computing system; receive, through the graphical interface, a request for testing data from the user computing system, wherein the request for testing data comprises a first set of criteria; identify a computing system within a production environment, the computing system within the production environment comprising a first set of data that satisfies the first set of criteria; retrieve, from the computing system within the production environment, the first set of testing data; and transmit the first set of testing data to the user computing system.

In some embodiments, the executable code further causes the processor to receive, from the user computing system, a request to reserve the first set of testing data; based on the request to reserve the first set of testing data, prevent access to the first set of testing data by a second user computing system; and exclude the first set of data from further database query results.

In some embodiments, the executable code further causes the processor to detect that the first set of data comprises at least one set of sensitive data; and expunge the at least one set of sensitive data from the first set of data before transmitting the first set of testing data to the user computing system.

In some embodiments, the executable code further causes the processor to detect that the first set of data is insufficient to fulfill the request for testing data; receive, from the user computing system, a request to synthesize a second set of testing data; in response to the request to synthesize a second set of testing data, generate a set of synthetic data; and transmit the set of synthetic data to the user computing system.

In some embodiments, the executable code further causes the processor to detect a pattern of testing data requests from the user computing system; based on the pattern of testing data requests, determine a testing data type and testing data interval; transmit a notification to the user computing system, the notification comprising an option to create recurring testing data transfers according to the testing data type and the testing data interval; receive, from the user computing system, a selection of the option within the notification; and generate a schedule of recurring testing data transfers according to the testing data type and the testing data interval.

In some embodiments, the executable code further causes the processor to automatically detect that a testing application within the user computing system requires a second set of testing data; retrieve the second set of testing data from the production environment; and transmit the second set of testing data to the user computing system.

In some embodiments, the request for testing data further comprises a second set of criteria. In such embodiments, the executable code may further cause the processor to detect that the first set of data satisfies the first set of criteria but not the second set of criteria; and condition the first set of data to satisfy the second set of criteria before transmitting the first set of data to the user computing system.

In some embodiments, the executable code further causes the processor to detect that a connection within the integrated platform has become unresponsive; generate an alert comprising a status of the unresponsive connection; and transmit the alert to the user computing system.

Embodiments of the present disclosure may further provide a computer program product for managing testing data using an integrated platform. The computer program product may comprise at least one non-transitory computer readable medium having computer-readable program code portions embodied therein. The computer-readable program code portions may comprise an executable portion for receiving, from a user computing system, a request to access a web server for the integrated platform; an executable portion for, based on receiving the request to access the web server, presenting a graphical interface to the user computing system; an executable portion for receiving, through the graphical interface, a request for testing data from the user computing system, wherein the request for testing data comprises a first set of criteria; an executable portion for identifying a computing system within a production environment, the computing system within the production environment comprising a first set of data that satisfies the first set of criteria; an executable portion for retrieving, from the computing system within the production environment, the first set of testing data; and an executable portion for transmitting the first set of testing data to the user computing system.

In some embodiments, the computer-readable program code portions further comprise an executable portion for receiving, from the user computing system, a request to reserve the first set of testing data; an executable portion for, based on the request to reserve the first set of testing data, preventing access to the first set of testing data by a second user computing system; and an executable portion for excluding the first set of data from further database query results.

In some embodiments, the computer-readable program code portions further comprise an executable portion for detecting that the first set of data comprises at least one set of sensitive data; and an executable portion for expunging the at least one set of sensitive data from the first set of data before transmitting the first set of testing data to the user computing system.

In some embodiments, the computer-readable program code portions further comprise an executable portion for detecting that the first set of data is insufficient to fulfill the request for testing data; an executable portion for receiving, from the user computing system, a request to synthesize a second set of testing data; an executable portion for, in response to the request to synthesize a second set of testing data, generating a set of synthetic data; and an executable portion for transmitting the set of synthetic data to the user computing system.

Embodiments of the present disclosure may further provide a computer-implemented method for managing testing data using an integrated platform. The method may comprise receiving, from a user computing system, a request to access a web server for the integrated platform; based on receiving the request to access the web server, presenting a graphical interface to the user computing system; receiving, through the graphical interface, a request for testing data from the user computing system, wherein the request for testing data comprises a first set of criteria; identifying a computing system within a production environment, the computing system within the production environment comprising a first set of data that satisfies the first set of criteria; retrieving, from the computing system within the production environment, the first set of testing data; and transmitting the first set of testing data to the user computing system.

In some embodiments, the method further comprises receiving, from the user computing system, a request to reserve the first set of testing data; based on the request to reserve the first set of testing data, preventing access to the first set of testing data by a second user computing system; and excluding the first set of data from further database query results.

In some embodiments, the method further comprises detecting that the first set of data comprises at least one set of sensitive data; and expunging the at least one set of sensitive data from the first set of data before transmitting the first set of testing data to the user computing system.

In some embodiments, the method further comprises detecting that the first set of data is insufficient to fulfill the request for testing data; receiving, from the user computing system, a request to synthesize a second set of testing data; in response to the request to synthesize a second set of testing data, generating a set of synthetic data; and transmitting the set of synthetic data to the user computing system.

In some embodiments, the method further comprises detecting a pattern of testing data requests from the user computing system; based on the pattern of testing data requests, determining a testing data type and testing data interval; transmitting a notification to the user computing system, the notification comprising an option to create recurring testing data transfers according to the testing data type and the testing data interval; receiving, from the user computing system, a selection of the option within the notification; and generating a schedule of recurring testing data transfers according to the testing data type and the testing data interval.

In some embodiments, the method further comprises automatically detecting that a testing application within the user computing system requires a second set of testing data; retrieving the second set of testing data from the production environment; and transmitting the second set of testing data to the user computing system.

In some embodiments, the request for testing data further comprises a second set of criteria. In such embodiments, the method further comprises detecting that the first set of data satisfies the first set of criteria but not the second set of criteria; and conditioning the first set of data to satisfy the second set of criteria before transmitting the first set of data to the user computing system.

In some embodiments, the method further comprises detecting that a connection within the integrated platform has become unresponsive; generating an alert comprising a status of the unresponsive connection; and transmitting the alert to the user computing system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the integrated platform described herein is implemented. The entity may be a business organization, a non-profit organization, a government organization, and the like.

"Entity system" or "testing data management system" as used herein may refer to the computing systems, hardware and/or software, and/or other resources used by the entity to manage or provision testing data, which may include the integrated platform.

"User" as used herein may refer to an individual who may interact with the integrated. Accordingly, the user may be an employee, associate, contractor, or other authorized party who may access, use, administrate, maintain, and/or manage the computing systems within the entity system. In other embodiments, the user may be a client of the entity.

"Resource" as used herein may refer an object which is typically transferred between the third party and the entity. The object may be tangible or intangible objects such as computing resources, data files, documents, funds, and the like.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop, or the computing system may be a stationary unit such as a personal desktop computer or networked terminal within an entity's premises. In some embodiments, the computing system may be a local or remote server which is configured to send and/or receive inputs from other computing systems on the network.

Embodiments of the present disclosure provide a system, computer program product, and method for providing a centralized, automated, and integrated platform for management and provisioning of testing data. In particular, the integrated platform may provide users (e.g., application developers) with a comprehensive interface through which the user may procure and/or customize data for the purposes of testing an application within a testing environment before migrating the application to a production environment. In this regard, the integrated platform may comprise various applications that allow users to migrate, mine, verify, condition, sanitize, reserve, synthesize, and/or provision testing data, among other such functions. Through the integrated platform, users may access various functions related to testing data in a single location, thereby increasing the efficiency of the application development process.

At least a portion of the functions of the integrated platform may executed upon receiving a request from a user. In this regard, the integrated platform may comprise a web-based service which includes a graphical interface that may be accessible by the user via an entity-provided application or third party application (e.g., a web browser). Through the graphical interface, the user may interact with interface elements to select various applications and/or functions with respect to testing data. For example, the user may wish to import sanitized testing data from the production environment. By using data which currently exists within the production environment, the user may ensure that the testing application receives testing data which conforms as closely to reality as possible. Furthermore, by sanitizing (e.g., removing sensitive information such as customer names, contact information, personal information) the production data, the system may address the data security/privacy concerns with using production data for testing purposes. In this regard, the user may, via a user computing system, log onto the web service to access the graphical interface for the integrated platform. Upon accessing the graphical interface, the user may select an option to sanitize certain production data and import the sanitized data to the production environment. Once the user has selected the option, the user computing system may submit a request to the integrated platform, where the user's request may be displayed to the user in the form of a testing data request queue. The integrated platform may, through the graphical interface, provide status updates for the user's request. The integrated platform may then sanitize the data as requested by the user and provision the sanitized testing data to the user computing system or to another computing system as designated by the user. In some embodiments, the integrated platform may further allow users to reserve certain sets of data for a particular testing application, which may then exclude other users from using the same set of reserved data.

In other embodiments, at least a portion of the functions of the integrated platform may be executed automatically. For instance, the integrated platform may automatically sanitize, condition, and/or provision testing data specific to the testing applications that are currently being developed. In this regard, the integrated platform may be configured to communicate with the computing systems hosting the testing application (e.g., the user computing system) through an application programming interface ("API"). In some embodiments, the integrated platform may be configured to detect the identity of the testing application and subsequently determine the needs of the testing application. For example, the integrated platform may detect that the testing application is configured to sort customer data such as customer names and contact information. Accordingly, the integrated platform may determine that the testing application requires testing data which contains customer names and contact information. The integrated platform may then automatically sanitize a set of production data corresponding to the testing application's requirements and provision the sanitized testing data to the computing system which hosts the testing application through an API-based interaction. In this way, the system may automatically provide testing data to testing applications to expedite the development process.

The system as disclosed herein offers numerous technological advantages over conventional methods. In particular, the centralized and integrated nature of the system addresses many of the common pain points in application development, such as difficulties in using disparate, disjointed applications for testing data management, ensuring testing data quality and/or security, testing data availability, the lack of reservation capabilities, and the like. Furthermore, the automated nature of the integrated platform may automatically provision testing data appropriate for each testing application, thereby increasing the computing efficiency of the application testing and development process by eliminating the manual steps of requesting testing data.

Figure 1:
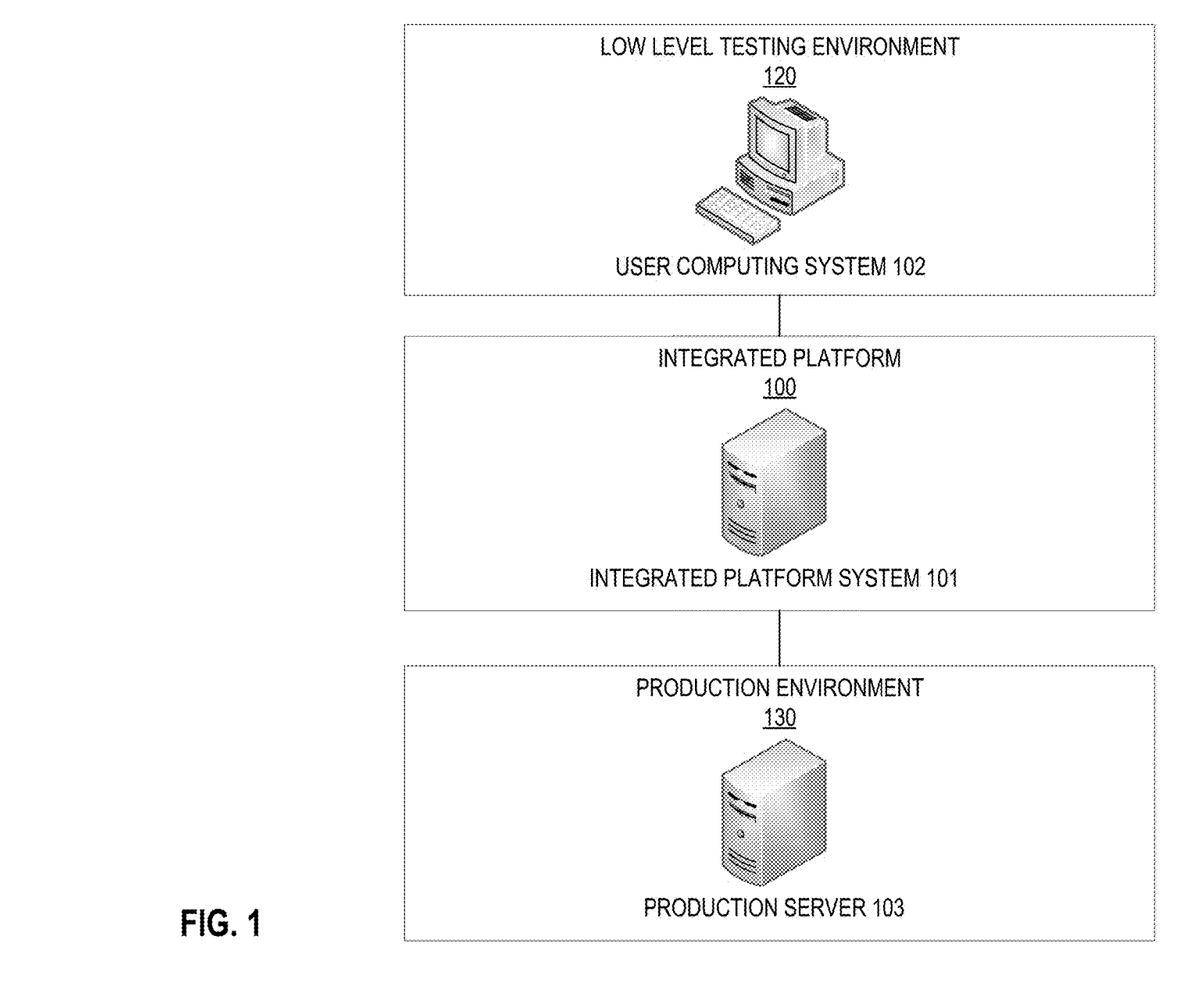
FIG. 1 is a block diagram illustrating an operating environment for the testing data management system, in accordance with some embodiments of the present disclosure.

Turning now to the figures, FIG. 1 is a block diagram illustrating an operating environment for the testing data management system, in accordance with some embodiments of the present disclosure. In particular, the operating environment may include an integrated platform system 101 within an integrated platform 100, where the integrated platform system 101 is in operative communication with a user computing system 102 within a low level testing environment 120 and a production server 103 in a production environment 130. The various computing systems as described herein may be connected to one another via a network. The network, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The integrated platform system 101, the user computing system 102, and the production server 103 typically represent computing systems within their respective environments. Said computing systems may be networked terminals, servers, desktop computers, laptops, smartphones or smart devices, IoT devices, or the like, or any combination thereof. The integrated platform system 101 may host the services necessary to pull testing data from the production server 103 and provision the testing data to the user computing system 102. The integrated platform system 101 may further host the web server containing the graphical interface as well as the various applications that relate to testing data management purposes. In this way, the integrated platform system 101 may serve as the centralized unit which oversees the management, procurement, and/or provisioning of testing data amongst the computing systems within the entity system.

The user computing system 102 is typically a computing system under the control of a user who is developing a testing application. Accordingly, the user may be an application developer who wishes to receive testing data for development of the testing application. In other embodiments, the user may be a superuser or administrator who may wish to control the management and/or flow of testing data within the entity system. Therefore, the user computing system 102 may be configured to connect to the integrated platform system 101 to receive testing data and/or access the graphical interface of the integrated platform 100. Typically, the testing data provisioning or management requests may be sent through the web interface, while the testing data itself may be transferred via an API-based interaction.

The production server 103 is typically a computing system that is currently being used to perform the functions related to the entity's objectives. Accordingly, the production server 103 may comprise various types of data that may be useful for testing purposes. For instance, the production server 103 may comprise client account data that, once sanitized, may serve as accurate (e.g., close to real-world) testing data to be used in the application development process. Accordingly, the integrated platform system 101 may be configured to pull testing data from the production server 103 in real-time or near real-time and perform the various conditioning and/or sanitizing steps necessary before provisioning and/or reserving said data to be sent to the user computing system 102.

It should be understood by those having ordinary skill in the art that although the integrated platform system 101, the user computing system 102, and the production server 103 are depicted as single units, each of the depicted components, or sub-components therein, may represent multiple units. In some embodiments, a given computing system as depicted in FIG. 1 may represent multiple systems configured to execute at least a portion of the functions of the depicted system. For instance, the singularly depicted integrated platform system 101 may represent a plurality of computing systems operating in a distributed fashion to host the web server, host and execute the various testing data management applications, communicate with the other computing systems within the entity system, or the like. As another example, the singularly depicted user computing system 102 may represent two separate computing systems within the low level testing environment 120. For instance, an application developer may use a computing system such as a desktop computer to access the integrated platform system 101 to retrieve testing data to be used on a headless server running the testing application within the low level testing environment 120.

Figure 2:
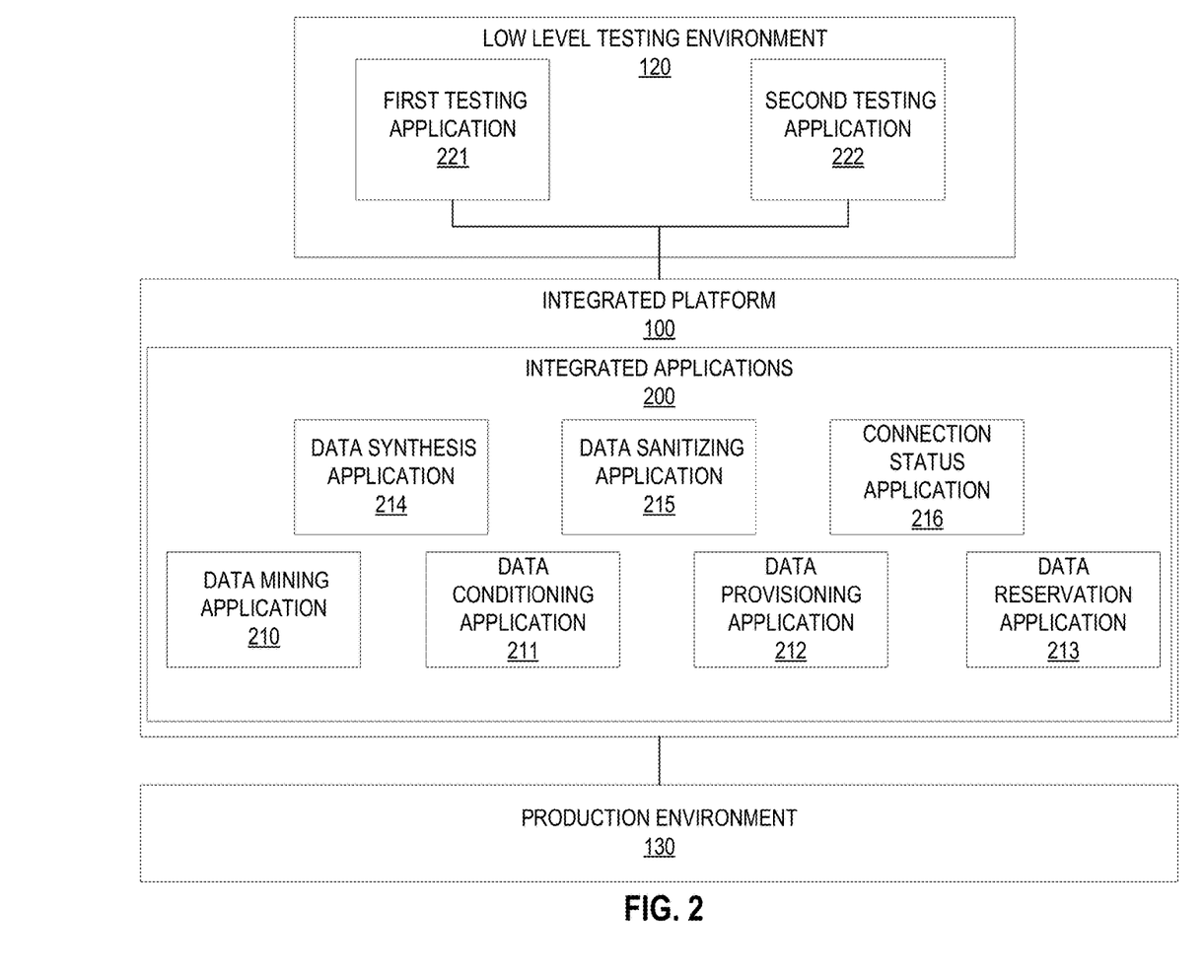
FIG. 2 is a block diagram illustrating the logical structures within the testing data management system, in accordance with some embodiments of the present disclosure.

FIG. 2 is a block diagram illustrating the logical structures within the testing data management system, in accordance with one embodiment of the present invention. In particular, the low level testing environment 120 may comprise a plurality of testing applications 121, 122 which are currently under development. Accordingly, one or more users from within the low level testing environment 120 may access the integrated platform 100 for the purposes of managing and/or acquiring testing data, which may involve the use of conditioned and/or sanitized data from the production environment 130.

The integrated platform 100 may contain several types of integrated applications 200, where each application is typically responsible for the execution of the functions related to the application's purpose, although it is within the scope of the disclosure for all of the functions as described herein to be executed within a single application. The following description is intended to provide examples of the various applications and their respective functionalities which may be included within the integrated platform 100. It should be understood that the following examples are provided for illustrative purposes only and should not be construed to limit the scope of the functionality of the integrated platform 100 or any of the applications integrated into the framework therein.

The integrated platform 100 may comprise a data mining application 110, where the data mining application 110 allows the user to dynamically create queries to search databases within the production environment 130 to find suitable testing data. The generated search query may comprise certain criteria for the testing data requested. In an exemplary embodiment, the user may wish to request client account data with certain characteristics (e.g., an account status, the amount of resources in the account, account usage, or the like). In such embodiments, the user may, through the graphical interface for the integrated platform 100, submit a testing data search query containing a predetermined set of criteria. The query may be submitted using plain text and/or interface elements such as drop-down menus, radio buttons, check boxes, or the like, such that users may submit queries without any knowledge of SQL or other database query languages. Based on the query submitted by the user, the data mining application 210 may search the production environment 130 for data that matches the criteria as specified in the query. Once said data has been found, the data mining application 210 may display the search results to the user. In some embodiments, the search results may contain data that must be sanitized (e.g., via the data sanitizing application 215) before it is displayed to the user and/or made available as testing data.

In some embodiments, the data mining application 210 may further comprise an intelligent data search assistant which may interact with the user within the graphical interface. In this regard, the data search assistant may use natural language to determine the user's objectives, such as by asking "how may I help you?" In response, the user may enter natural language to provide the nature of the user's session with the integrated platform 100 (e.g., a data mining request with certain criteria). The data search assistant may then automatically input the criteria into the data mining application 210 to provide search results to the user.

The integrated platform 100 may further comprise a data conditioning application 211 configured to condition testing data to match testing scenarios. In particular, the user may wish to test the testing application's ability to handle certain types of data sets and or scenarios. In an exemplary embodiment, an application developer may wish to test an application's notification functions when the resources within a client's account falls below a certain threshold. In such embodiments, the application developer (e.g., the user) may use the data conditioning application 211 to condition the data to match the desired test scenarios. In this embodiment, the conditioning application 211 may modify the testing data (e.g., data containing client account data) to reduce the amount of resources within the account to below the specified threshold. The data conditioning may be carried out by the conditioning application 211 on a real-time or near real-time basis to provide for on-demand conditioning of testing data.

The integrated platform 100 may further comprise a data provisioning application 212 configured to provide, copy, and/or migrate data from a source environment to a target environment. Typically, the data provisioning application 212 is configured to collect data from within the production environment 130 and provide the data to one or more applications 221, 222 within the low level testing environment 120. In this regard, the user may use the graphical interface to select a source environment (e.g., the production environment 130) and a target environment (e.g., the first testing application 221) and submit a request to the data provisioning application 212. The data provisioning application 212 may then add the request to a data provisioning queue for processing. In some embodiments, the request may require the data to be modified (e.g., conditioned, sanitized, reserved, or the like) before being made available to the target environment.

In some embodiments, the data provisioning application 212 may be further be configured to automatically detect the testing data requirements of the testing application. For instance, the data provisioning application 212 may, through machine learning, detect a pattern of testing data requests for a particular testing application. In an exemplary embodiment, a user may request a certain type of testing data (e.g., account data) at a particular interval (e.g., on a daily basis). Upon detecting the pattern of testing data requests, the data provisioning application 212 may notify the user that the pattern has been detected and provide the user with an option to set up a recurring testing data transfer. Once the user has accepted the option, the data provisioning application 212 may automatically provide testing data for the particular testing application at the specified interval. In some embodiments, the data provisioning application 212 may further be configured to reserve testing data at the specified intervals (e.g., via the data reservation application 213). By detecting testing data requirements through machine learning, the system may increase computing efficiency and save computing resources by preventing the need for users to manually request testing data.

The integrated platform 100 may further comprise a data reservation application 213 configured to reserve certain specified data for a particular user to the exclusion of other users within the entity's systems. In this regard, the user may access the data reservation application 213 to submit a request to reserve a certain set of data for use with a particular testing application. In some embodiments, the user may access the data reservation application 213 after finding a desirable set of data through the data mining application 210. Once the data reservation application 213 receives and approves the request, the data reservation application 213 may prevent the reserved data from appearing in search query results provided to other users (e.g., via the data mining application 210). In this way, the user may ensure that the reserved testing data will remain unused by other testing applications within the entity's systems.

The integrated platform 100 may further comprise a data synthesis application 214 configured to generate synthetic testing data to be used by the testing applications 221, 222. In some cases, sufficient data may not be available within the production environment 130 to satisfy the testing needs within the low level testing environment 120. In such embodiments, users may access the data synthesis application 214 to generate synthetic data (or dummy data) such that the testing process may continue even in the absence of available testing data within the production environment 130 on a real-time basis. In an exemplary embodiment, the testing application may require data on certain transactions that take place between user accounts. If suitable testing data may not be found within the production environment 130, the data synthesis application 214 may generate synthetic transactions to be used for testing purposes and make the data available to the testing application.

The integrated platform 100 may further comprise a data sanitizing application 215 configured to strip sensitive information from testing data obtained from within the production environment 130. For instance, the production environment 130 may contain such data as client information, trade secret information, business records, or other types of confidential information that should not leave the production environment 130. Accordingly, the data sanitizing application 215 may be configured to remove confidential information (e.g., client account numbers, identifying information, or the like) from testing data before making the data available to the low level testing environment 120.

The integrated platform 100 may further comprise a connection status application 216 configured to monitor the statuses of the data pipelines, applications, data stores, data connections, and other such components of the integrated platform 100. In particular, the connection status application 216 may track the health of the network connections (across all nodes and/or jumps involved in the connection), uptimes and/or availability, stability, performance, and other metrics of the various components of the integrated platform 100 to maintain the functionality of the integrated platform 100. In some embodiments, the connection status application 216 may be configured to report the statuses of the various components to the user through the graphical interface. Upon detecting that one or more components of the integrated platform 100 have become unstable, non-responsive, unavailable, or otherwise impaired, the connection status application 216 may be configured to generate an alert containing a notification about the impaired component and send the alert to the user computing system through the graphical interface. In some embodiments, the alert may further comprise an audible notification which causes the user computing system to play the audible notification through an output device within the user interface.

Figure 3:
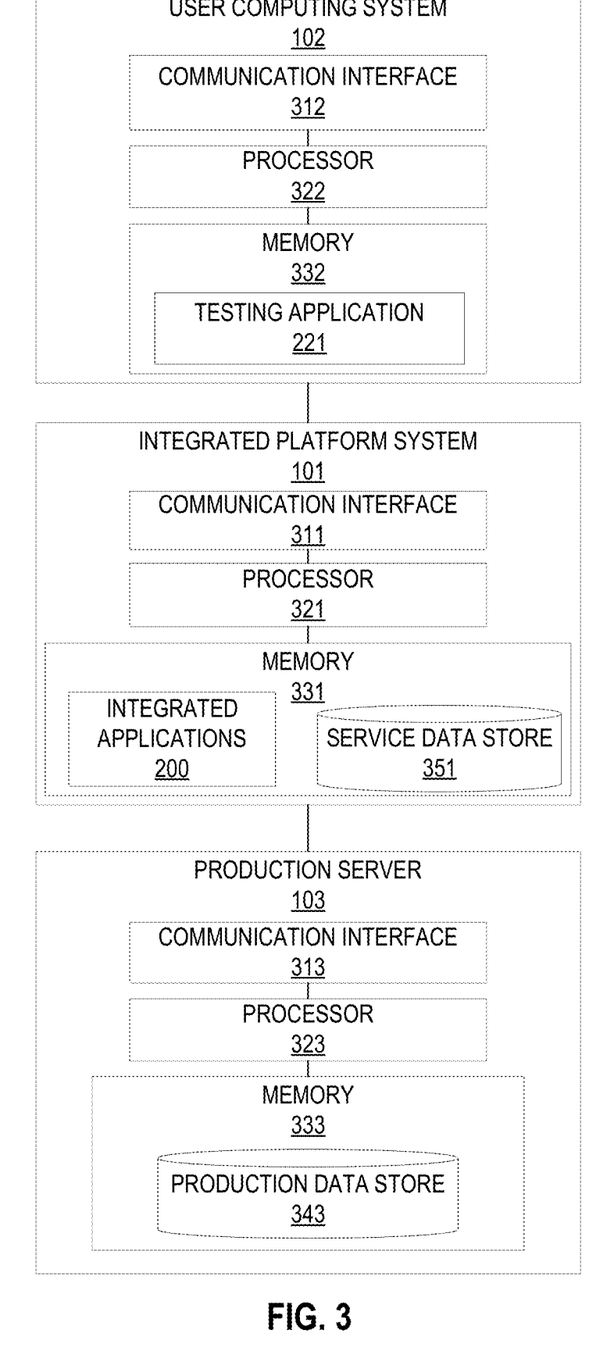
FIG. 3 is a block diagram illustrating the integrated platform system, the user computing system, and the production server in more detail, in accordance with some embodiments of the present disclosure.

FIG. 3 is a block diagram illustrating the integrated platform system 101, the user computing system 102, and the production server 103 in more detail, in accordance with some embodiments of the present disclosure. The integrated platform system 101 may comprise a processor 321 communicably coupled to such devices as a communication interface 311 and a memory 331. The processor 321, and other processors described herein, typically includes circuitry for implementing communication and/or logic functions of the computing systems or devices as described herein. For example, the processor 321 may include a digital signal processor device, a microprocessor device, and various analog to digital converters, digital to analog converters, and/or other support circuits. The integrated platform system 101 may use the communication interface 311 to communicate with other devices over the network through web interactions, API-based communications, or the like. "Communication interface" as described herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 331 of the integrated platform system 101 may comprise the integrated applications 200 used within the integrated platform 100. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

It should be understood that while the integrated applications 200 are depicted in FIG. 3 as a single unit being stored within the memory 331 of the integrated platform system 101, the integrated applications 200 may represent the various applications, services, plugins, or other types of software needed to execute the functions of the integrated platform 100. Accordingly, the integrated applications 200 may comprise the applications as depicted in FIG. 2, a web server configured to set up web-based interactions with the user computing system 102, API frameworks to communicate with the user computing system 102 and/or the production server 103, or the like.

The memory 331 of the integrated platform system 101 may further comprise a service data store 351 which may comprise scripts, macros, presets, user settings, services, and the like, which may be used by the integrated platform 100 and/or the user of the user computing system 102 to access the various functions therein. Accordingly, some of the data within the service data store 351 may be user-defined data to automate at least a portion of the functions that the user may take within the integrated platform 100. In other embodiments, some of the data within the service data store 351 may be defined by the integrated platform system 101 to maintain the ongoing functionality of the integrated platform 100.

The user computing system 102 may also comprise a processor 322 communicatively coupled with such devices as a communication interface 312 and a memory 332. Typically, the user computing system 102 interacts with the integrated platform system 101 to access the functions of the system (e.g., testing data requests and/or management). Accordingly, the user computing system 102 may be a desktop computer, networked terminal, laptop computer, tablet, smartphone, or the like. Typically, the user computing system 102 contains a testing application 221 within the memory 332, where the testing application 221 is an application being developed using testing data. In such embodiments, the user may access the integrated platform system 101 via the user computing system 102 to obtain testing data for use with the testing application 221 within the memory 332. In other embodiments, the user computing system 102 may represent multiple systems such that the user accesses the integrated platform system 101 using the user computing system 102 to obtain testing data for a testing application stored on a separate computing system.

In some embodiments, the user computing system 102 may be configured to accept inputs from a user (e.g., an employee or client of the entity) who may use the user computing system 102 to access the features of the integrated platform system 101. In this regard, the user computing system 102 may further comprise a user interface comprising hardware and software implements to accept input from and provide output to the user. The user interface may comprise hardware such as a display, audio output devices, projectors, and the like, or input devices such as keyboards, mice, sensors, cameras, microphones, biometric input devices (e.g., fingerprint readers), and the like. The user interface may further comprise software such as a graphical or command-line interface through which the user may provide inputs and/or receive outputs from the user computing system 102. It should be understood that the display on which the user interface is presented may include an integrated display (e.g. a tablet or smartphone screen) within the user computing system 102, or an external display device (e.g. a computer monitor or television).

The production server 103 may also comprise a processor 323 communicatively coupled with such devices as a communication interface 313 and a memory 333. The production server 103 is typically a computing system that is currently being used to execute various functions towards the objectives of the entity. Accordingly, in embodiments in which the entity is a business organization, the production server 103 may be responsible for executing various business processes, such as the storage of client data, provision of services, or the like. In this regard, the memory 333 may contain a production data store 343 which may contain data relating to the organization's processes (e.g., account data, transactional data, or the like). The data within the production data store 343 may be accessed by the various integrated applications 200 of the integrated platform system 101. For instance, the data sanitizing application may access the production data store 343 to sanitize production data to prepare testing data for use by the testing application 221. In other embodiments, the data mining application may access the production data store 343 based on certain search criteria as specified by the user.

Figure 4:
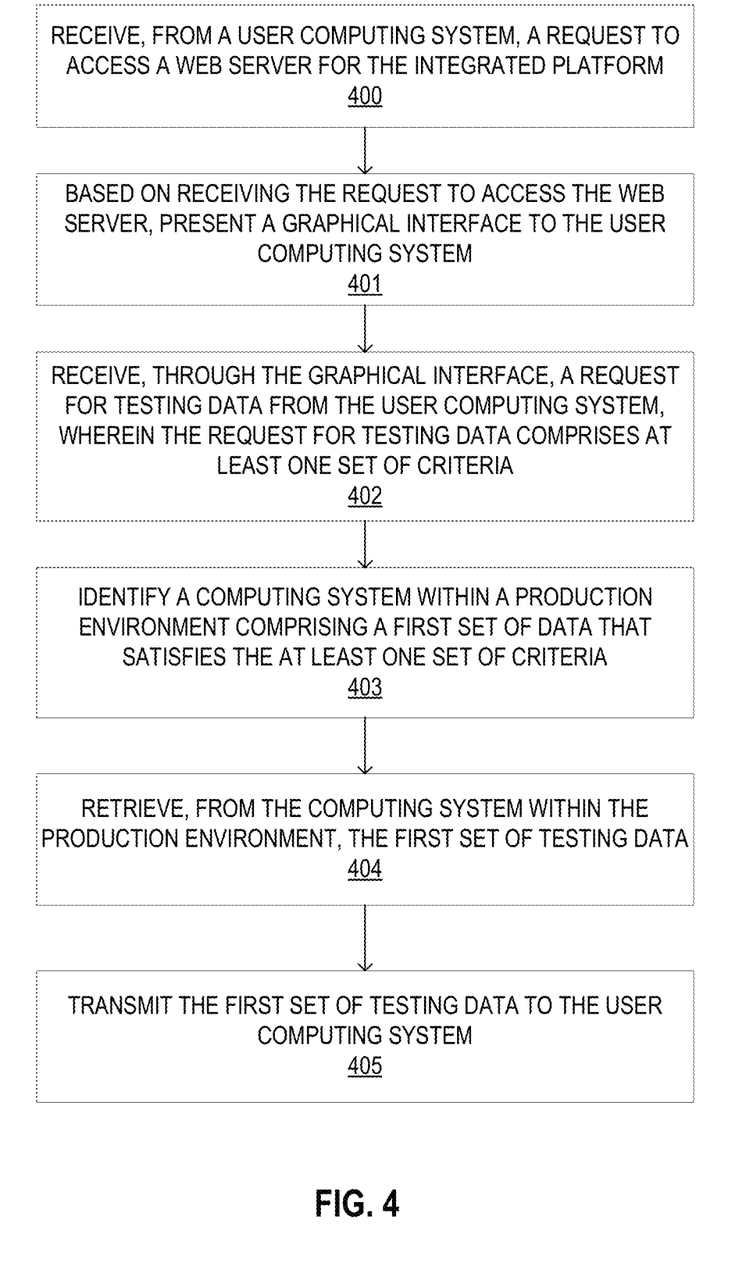
FIG. 4 is a process flow for the extended recognition system, in accordance with some embodiments of the present disclosure.

FIG. 4 is a process flow for the extended recognition system, in accordance with some embodiments of the present disclosure. The process begins at block 400, where the system receives, from a user computing system, a request to access a web server for the integrated platform. Typically, the request is received from the user computing system over a network. The user computing system may use an entity provided application or third-party application such as a web browser to access the web server for the integrated platform. In some embodiments, the web server may require the user computing system to provide one or more authentication credentials to access the web server. Such authentication credentials may include a username and password, biometric information, a secure token, a PIN, swipe pattern, or the like. Once the user computing system has been authenticated, the user computing system may access the various functions of the integrated platform through the web server.

The process continues to block 401, where the system, based on receiving the request to access the web server, presents a graphical interface to the user computing system. The graphical interface may comprise a user dashboard with various interface elements with which the user may interact to access the functions of the integrated platform. For example, the various functions and/or integrated applications may be represented by icons, buttons, tabs, or other selectable elements which, when selected, may provide further options for input to the user which relate to the application selected. For instance, the user may click, tap, or otherwise select an interface element corresponding to the data mining application. Upon selecting the data mining application, the graphical interface may produce a screen or window which provides various input fields, check boxes, radio buttons, and other elements to allow the user to enter criteria for the data to be mined. For instance, the user may specify that the data must contain client account data with resources above or below a certain threshold. Through the graphical interface, the user may be able to construct a search query without the need to know the specific database query languages of the servers within the production environment.

The process continues to block 402, where the system receives, through the graphical interface, a request for testing data from the user computing system, wherein the request for testing data comprises at least one set of criteria. The user may specify various criteria for the testing data to ensure that the data conforms to the desired testing scenarios for the testing application. For instance, the user may wish to test certain notification functions of a testing application that are triggered once the testing application has detected that the amount of resources within a client account has dropped below a certain threshold. In this regard, the user may specify a set of criteria that requires the testing data to contain account data with resources below a certain threshold.

The process continues to block 403, where the system identifies a computing system within a production environment comprising a first set of data that satisfies the at least one set of criteria. At this stage, the system has constructed a search query that allows the system to survey the various computing systems within the production environment for data that satisfies the user's criteria. Continuing the above example, the system may identify and locate a production server which contains client account data. The system may then search the client account data to identify the data which conforms to the user's criteria (e.g., the resources within the accounts are all below a specified threshold).

In some embodiments, the system may detect that the procured data contains sensitive data or information which must not be circulated to the testing environment. For example, the procured data may contain a client's personal or private information, confidential business records, or the like. In such embodiments, the system may be configured to expunge the sensitive data from the procured data before making the data available to the testing environment. In some embodiments, the system may delete the sensitive data and make the procured data available with the sensitive data redacted. In other embodiments, the system may fill the deleted sensitive data fields with dummy data, which may be located within a data store of the integrated platform.

In some embodiments, the system may detect that the procured data satisfies certain criteria specified by the user, but not others. In such embodiments, the system may be configured to condition the data to conform to all of the criteria specified for the user. For instance, the user may have specified that the data must contain information about client accounts with resources below a certain threshold and accounts that have been flagged with a certain status (e.g., inactive). If the system is able to procure data that satisfies the first criteria but not the second, the system may modify the procured data to additionally satisfy the second criteria.

In some embodiments, the system may detect that the procured data is insufficient to fulfill the testing data request. For example, the system may receive a request from the user computing system to generate synthesized test data in addition to the procured data. In such embodiments, the computing system may generate synthetic data (e.g., synthetic transactional data) and transmit the synthetic data to the user computing system in addition to the procured data. In other embodiments, the system may automatically detect the needs of the testing application and determine that a second set of testing data is required. In such embodiments, the system may perform an additional search for testing data within the production environment and transmit the additional testing data to the user computing system. Alternatively, or in addition, the system may transmit synthetic data to the user computing system.

In some embodiments, the system may receive a request from the user computing system to reserve the data found by the system within the production server. Upon receiving the request, the system may prevent access to the reserved data by other users within the entity's systems (e.g., by placing read/write restrictions on the reserved data). In some embodiments, the system may further exclude the reserved data from subsequent search results.

The process continues to block 404, where the system retrieves, from the computing system within the production environment, the first set of testing data. Once data that satisfies the user's criteria has been identified within the production server, the system may pull a copy of the data from the production environment into the integrated platform. Once the data has been pulled, the system may use various integrated applications to validate, sanitize, condition, or otherwise modify the data as necessary to satisfy the testing data requirements of the testing application.

The process concludes at block 405, where the system transmits the first set of testing data to the user computing system. Typically, the system transmits the testing data to the testing application on the user computing system via an API. In this way, the integrated platform effectively allows for the simulation of a production environment for testing purposes, which allows for a more efficient and expedient application testing and development process.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or—as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/035,077 now U.S. Patent Publication No. 2020/0019721 | HOLISTIC AND SECURE RESOURCE PROVISIONING GATEWAY SYSTEM | Concurrently Herewith |
| 16/035,114 now U.S. Patent Publication No. 2020/0019696 | MONITORING DATA CONSUMPTION IN AN APPLICATION TESTING ENVIRONMENT | Concurrently Herewith |

-continued

| U.S. patent application Ser. No. | Title | Filed On |
|---|---|---|
| 16/035,345 now U.S. Patent Publication No. 2020/0019648 | SYSTEM FOR MONITORING LOWER LEVEL ENVIRONMENT FOR UNSANITIZED DATA | Concurrently Herewith |
| 16/,035162 now U.S. Patent Publication No. 2020/0019729 | SYSTEM FOR PROVISIONING VALIDATED SANITIZED DATA FOR APPLICATION DEVELOPMENT | Concurrently Herewith |

What is claimed is:

1. A system for managing testing data using an integrated platform, comprising:
a processor;
a communication interface; and
a memory having executable code stored thereon, wherein the executable code, when executed by the processor, causes the processor to:
receive, from a first user computing system, a request to access a web server for the integrated platform;
based on receiving the request to access the web server for the integrated platform, present a graphical interface to the first user computing system;
receive, through the graphical interface, a request for testing data from the first user computing system, wherein the request for testing data comprises a first set of criteria;
identify a computing system within a production environment, wherein the computing system within the production environment comprises a first set of testing data that satisfies the first set of criteria;
retrieve, from the computing system within the production environment, the first set of testing data;
transmit the first set of testing data to the first user computing system;
detect a pattern of testing data requests from the first user computing system;
based on the pattern of testing data requests, determine a testing data type and a testing data interval;
transmit a notification to the first user computing system, wherein the notification comprises an option to create recurring testing data transfers according to the testing data type and the testing data interval;
receive, from the first user computing system, a selection of the option to create the recurring testing data transfers within the notification; and
generate a schedule of the recurring testing data transfers according to the testing data type and the testing data interval.

2. The system of claim 1, wherein the executable code, when executed by the processor, further causes the processor to:
receive, from the first user computing system, a request to reserve the first set of testing data;
based on the request to reserve the first set of testing data, prevent access to the first set of testing data by a second user computing system; and
exclude the first set of testing data from further database query results.

3. The system of claim 1, wherein the executable code, when executed by the processor, further causes the processor to:
detect that the first set of testing data comprises at least one set of sensitive data; and
expunge the at least one set of sensitive data from the first set of testing data before transmitting the first set of testing data to the first user computing system.

4. The system of claim 1, wherein the executable code, when executed by the processor, further causes the processor to:
detect that the first set of testing data is insufficient to fulfill the request for testing data;
receive, from the first user computing system, a request to synthesize a second set of testing data;
in response to the request to synthesize the second set of testing data, generate a set of synthetic data; and
transmit the set of synthetic data to the first user computing system.

5. The system of claim 1, wherein the executable code, when executed by the processor, further causes the processor to:
automatically detect that a testing application within the first user computing system requires a second set of testing data;
retrieve the second set of testing data from the production environment; and
transmit the second set of testing data to the first user computing system.

6. The system of claim 1, wherein the request for testing data further comprises a second set of criteria, and wherein the executable code, when executed by the processor, further causes the processor to:
detect that the first set of testing data satisfies the first set of criteria but not the second set of criteria; and
condition the first set of testing data to satisfy the second set of criteria before transmitting the first set of testing data to the first user computing system.

7. The system of claim 1, wherein the executable code, when executed by the processor, further causes the processor to:
detect that a connection within the integrated platform has become unresponsive;
generate an alert comprising a status of the unresponsive connection within the integrated platform; and
transmit the alert to the first user computing system.

8. A computer program product for managing testing data using an integrated platform, the computer program product comprising at least one non-transitory computer-readable medium having computer-readable program code portions embodied therein, the computer-readable program code portions comprising:
a computer-readable program code portion executed to receive, from a first user computing system, a request to access a web server for the integrated platform;
a computer-readable program code portion executed to, based on receiving the request to access the web server for the integrated platform, present a graphical interface to the first user computing system;
a computer-readable program code portion executed to receive, through the graphical interface, a request for testing data from the first user computing system, wherein the request for testing data comprises a first set of criteria;
a computer-readable program code portion executed to identify a computing system within a production environment, wherein the computing system within the production environment comprises a first set of testing data that satisfies the first set of criteria;

a computer-readable program code portion executed to retrieve, from the computing system within the production environment, the first set of testing data;
a computer-readable program code portion executed to transmit the first set of testing data to the first user computing system;
a computer-readable program code portion executed to detect a pattern of testing data requests from the first user computing system;
a computer-readable program code portion executed to, based on the pattern of testing data requests, determine a testing data type and a testing data interval;
a computer-readable program code portion executed to transmit a notification to the first user computing system, wherein the notification comprises an option to create recurring testing data transfers according to the testing data type and the testing data interval;
a computer-readable program code portion executed to receive, from the first user computing system, a selection of the option to create the recurring testing data transfers within the notification; and
a computer-readable program code portion executed to generate a schedule of the recurring testing data transfers according to the testing data type and the testing data interval.

9. The computer program product of claim 8, wherein the computer-readable program code portions further comprise:
a computer-readable program code portion executed to receive, from the first user computing system, a request to reserve the first set of testing data;
a computer-readable program code portion executed to, based on the request to reserve the first set of testing data, prevent access to the first set of testing data by a second user computing system; and
a computer-readable program code portion executed to exclude the first set of testing data from further database query results.

10. The computer program product of claim 8, wherein the computer-readable program code portions further comprise:
a computer-readable program code portion executed to detect that the first set of testing data comprises at least one set of sensitive data; and
a computer-readable program code portion executed to expunge the at least one set of sensitive data from the first set of testing data before transmitting the first set of testing data to the first user computing system.

11. The computer program product of claim 8, wherein the computer-readable program code portions further comprise:
a computer-readable program code portion executed to detect that the first set of testing data is insufficient to fulfill the request for testing data;
a computer-readable program code portion executed to receive, from the first user computing system, a request to synthesize a second set of testing data;
a computer-readable program code portion executed to, in response to the request to synthesize the second set of testing data, generate a set of synthetic data; and
a computer-readable program code portion executed to transmit the set of synthetic data to the first user computing system.

12. A computer-implemented method for managing testing data using an integrated platform, the computer-implemented method comprising:
receiving, from a first user computing system, a request to access a web server for the integrated platform;
based on receiving the request to access the web server for the integrated platform, presenting a graphical interface to the first user computing system;
receiving, through the graphical interface, a request for testing data from the first user computing system, wherein the request for testing data comprises a first set of criteria;
identifying a computing system within a production environment, wherein the computing system within the production environment comprises a first set of testing data that satisfies the first set of criteria;
retrieving, from the computing system within the production environment, the first set of testing data;
transmitting the first set of testing data to the first user computing system;
detecting a pattern of testing data requests from the first user computing system;
based on the pattern of testing data requests, determining a testing data type and a testing data interval;
transmitting a notification to the first user computing system, wherein the notification comprises an option to create recurring testing data transfers according to the testing data type and the testing data interval;
receiving, from the first user computing system, a selection of the option to create the recurring testing data transfers within the notification; and
generating a schedule of the recurring testing data transfers according to the testing data type and the testing data interval.

13. The computer-implemented method of claim 12, wherein the computer-implemented method further comprises:
receiving, from the first user computing system, a request to reserve the first set of testing data;
based on the request to reserve the first set of testing data, preventing access to the first set of testing data by a second user computing system; and
excluding the first set of testing data from further database query results.

14. The computer-implemented method of claim 12, wherein the computer-implemented method further comprises:
detecting that the first set of testing data comprises at least one set of sensitive data; and
expunging the at least one set of sensitive data from the first set of testing data before transmitting the first set of testing data to the first user computing system.

15. The computer-implemented method of claim 12, wherein the computer-implemented method further comprises:
detecting that the first set of testing data is insufficient to fulfill the request for testing data;
receiving, from the first user computing system, a request to synthesize a second set of testing data;
in response to the request to synthesize the second set of testing data, generating a set of synthetic data; and
transmitting the set of synthetic data to the first user computing system.

16. The computer-implemented method of claim 12, wherein the computer-implemented method further comprises:
automatically detecting that a testing application within the first user computing system requires a second set of testing data;
retrieving the second set of testing data from the production environment; and transmitting the second set of testing data to the first user computing system.

17. The computer-implemented method of claim 12, wherein the request for testing data further comprises a second set of criteria, and wherein the computer-implemented method further comprises:
- detecting that the first set of testing data satisfies the first set of criteria but not the second set of criteria; and
- conditioning the first set of testing data to satisfy the second set of criteria before transmitting the first set of testing data to the first user computing system.

18. The computer-implemented method of claim 12, wherein the computer-implemented method further comprises:
- detecting that a connection within the integrated platform has become unresponsive;
- generating an alert comprising a status of the unresponsive connection within the integrated platform; and
- transmitting the alert to the first user computing system.

\* \* \* \* \*